US011477688B2

(12) United States Patent
Trim et al.

(10) Patent No.: US 11,477,688 B2
(45) Date of Patent: Oct. 18, 2022

(54) ADVANCED BEARER MANAGEMENT IN A TELECOMMUNICATIONS NETWORK (71) Applicant: International Business Machines Corporation, Armonk, NY (US)

(72) Inventors: Craig M. Trim, Ventura, CA (US); Lakisha R. S. Hall, Upper Marlboro, MD (US); Gandhi Sivakumar, Bentleigh (AU); Kushal Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 16/654,446

(22) Filed: Oct. 16, 2019

(65) Prior Publication Data
US 2021/0120451 A1 Apr. 22, 2021

(51) Int. Cl.
H04W 28/02 (2009.01)
H04W 24/08 (2009.01)
(52) U.S. Cl.
CPC ....... H04W 28/0268 (2013.01); H04W 24/08 (2013.01); H04W 28/0263 (2013.01)
(58) Field of Classification Search
CPC ......... H04W 28/0268; H04W 28/0263; H04W 24/08
USPC ........................................................ 370/229
See application file for complete search history.

(56) References Cited

U.S. PATENT DOCUMENTS 9,794,825 B2 10/2017 Grinshpun et al.
10,123,210 B2 11/2018 Nair
10,123,346 B1* 11/2018 Liu ................... H04L 1/0018
2004/0236547 A1 11/2004 Rappaport
2010/0216477 A1* 8/2010 Ryan ................... H04W 16/04
455/449
2014/0098671 A1* 4/2014 Raleigh ................. G06Q 20/40
370/235
2015/0131119 A1 5/2015 Narahashi
2018/0376394 A1 12/2018 Hahn et al.
2019/0364492 A1* 11/2019 Azizi ................ H04W 52/0264
(Continued)

OTHER PUBLICATIONS

Adel, "Advanced Dynamic spectrum 5G mobile networks Employing Licensed shared access," Grant Agreement 619647 for: Collaborative Project acronym ADEL, Deliverable D5.4—Medium access and control plane protocols, Sep. 19, 2016, 48 pages.
(Continued)

Primary Examiner — Intekhaab A Siddiquee
(74) Attorney, Agent, or Firm — Richard B. Thomas (57) ABSTRACT A method and a system for generating data bearer mappings are provided. The method includes collecting node information from a radio access node, the node information includes resource sets operating within the radio access node. The method further includes receiving a bearer channel of a user equipment from the radio access node. The bearer channel includes a quality of service class identifier level. The method also includes connecting to the bearer channel that is transmitting data related to the user equipment and generating an insight that is based on the data and the QCI level of the user equipment. The method further includes determining a bearer mapping for the radio access nodes by analyzing node information and the insight. The bearer mapping is then transmitted to the radio access node.

17 Claims, 7 Drawing Sheets (56) References Cited

U.S. PATENT DOCUMENTS

2020/0112876 A1* 4/2020 Sridhar ............. H04W 28/0268
2020/0367109 A1* 11/2020 Chen .................... H04W 36/00

OTHER PUBLICATIONS

Disclosed Anonymously, "Methods and Apparatus for LTE Single Cell Point to Multipoint Transmission (SC-PTM) Operations," An IP.com Prior Art Database Technical Disclosure, IP.com No. IPCOM000252214D, Dec. 22, 2017, 23 pages.

Lin et al., "Advanced Dynamic Channel Access Strategy in Spectrum Sharing 5G Systems," Dynamic Spectrum Management for 5G, IEEE Wireless Communications, Oct. 2017, pp. 74-80, IEEE. DOI: 10.1109/MWC.2017.1700091.

Motorola et al., "Method of Providing Admission Control on the WAN Link between the Customer Enterprise Network and Enhanced Packet Core," An IP.com Prior Art Database Technical Disclosure, IP.com No. IPCOM000205244D, Mar. 22, 2011, 6 pages.

Nardini et al., "Resouice allocation for network-controlled device-to-device communications in LTE-Advanced," Selfarchived version—to appear on the Springer Wireless Networks Journal (accepted Jan. 2016), pp. 1-24.

"New Business Opportunities with 5G and Cloud," Ericsson 2017, https://www.ericsson.com/en/news/2017/4/optimizing-network-applications-for-5g.

Bearers, default Bearers, dedicated Bearers—naughty Bearers, Posted: Jan. 25, 2010, https://windancersth.wordpress.com/2010/01/25/bearers-default-bearers-dedicated-bearers-naughty-bearers/comment-page-1/.

LTE Tutorials—LTE eNB Architecture, https://www.artizanetworks.com/resources/tutorials/arc.html.

QoS Class Identifier—Wikipedia, https://en.wikipedia.org/wiki/QoS_Class_Identifier, printed Jun. 10, 2021.

Quality of Service (QoS) in LTE—BEC Technologies, https://bectechnologies.net/whitepaper/.

* cited by examiner

ADVANCED BEARER MANAGEMENT IN A TELECOMMUNICATIONS NETWORK

BACKGROUND

The present disclosure relates to bearer channel management, and more specifically, to leveraging network function virtualization techniques within a core network to enable scaling and reconfiguration of node resources.

5G networks are capable of instantiating services or network functions based on observed network behavior. For example, network behavior can be an influx of devices connected to the network causing increased traffic across data bearers resulting in congestion. As a result, a network operator can manually scale up or down a network function to accommodate for that network behavior. The network operators react to the change as opposed to anticipating possible changes in network behavior. Additionally, any network function implemented to respond to a network behavior requires additional time. This can be due to some network functions not resulting in instantaneous network reconfiguration. Depending on the function, it may take several minutes for a network reconfiguration to complete.

SUMMARY

Various embodiments are directed to a method of generating a bearer mapping for a radio access node within a telecommunications network. The method includes collecting node information from a radio access node, the node information includes resource sets operating within the radio access node. The method further includes receiving a bearer channel of a user equipment from the radio access node. The bearer channel includes a quality of service class identifier (QCI) level. The method also includes connecting to the bearer channel that is transmitting data for the user equipment and generating an insight that is based on the data and the QCI level of the user equipment. The method further includes determining a bearer mapping for the radio access nodes by analyzing node information as well as the insight. The bearer mapping is then transmitted to the radio access node for implementation.

Further embodiments are directed to a method of providing information of a radio access node within a telecommunications network. The method includes connecting a wireless transmit/receive unit to a radio access node over a radio bearer. The method further includes generating a channel identification for the wireless transmit/receive unit and transmitting, over a network bearer, to a core network, user equipment information for the wireless transmit/receive unit and the channel identification. The user equipment information includes a QCI level.

Additional embodiments are directed to a system, to generate bearer mappings for radio access nodes, including at least one processing component and at least one memory component. The system also includes a bearer channel monitor configured to connect to bearer channels and monitor data transmission across the bearer channels. The system also includes a pattern to data analyzer configured to detect patterns within the data transmission and a history mapper configured to store historical bearer mappings of radio access nodes. The system further includes a quality of service class identifier and monitor configured to identify quality of service class identifier levels of the data transmissions and monitor for changes in the quality of service class identifier levels. The system also includes a stream classifier configured to generate insights by performing a cognitive analysis on the data transmissions, the patterns, and the QCI levels. The system also includes a resource profile to bearer mapper configured to receive resource set information from the radio access nodes. The resource profile to bearer mapper is further configured to generate updated bearer mappings for the radio access nodes based on the insights and the resource set information.

BRIEF DESCRIPTION OF THE DRAWINGS

These and other features, aspects, and advantages of the embodiments of the disclosure will become better understood with regard to the following description, appended claims, and accompanying drawings where:

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numeral are used to designate like parts in the accompanying drawings.

DETAILED DESCRIPTION

Data traffic across telecommunications systems is ever increasing with radio access network user plane congestion becoming an important issue to be addressed. Currently, user plane traffic is carried through virtual connections located in data bearers. The data bearers can become over burdened when there is an increase demand in data traffic causing congestion within the virtual connections.

Congestion occurs when a service requested by a user over a data bearer does not meet the quality of service (QoS) standards set for that service. This can be due to the data bearers being unable to sufficiently transmit data to the user within a certain time frame.

A radio access network (RAN) can increase the number of virtual connections, or service flows, in an attempt to mitigate any possible congestion. Each service flow that is created can then be assigned a QoS characteristic which means that different service flows will have varying QoS standards that need to be met. QoS control can occur at different levels such as within a RAN or core network (CN).

Current LTE architectures can alleviate the user plane congestion using different QoS class identifier (QCI) values. The QCIs can have different priority levels and can be allocated to the bearers opened by different classes of subscribers. With the advent of 5G architecture, next generation telecommunications systems can provide more advanced techniques in alleviating congestion caused by the increasing nature of data traffic. Some of the advanced techniques being implemented into 5G architecture include network function virtualization and network slicing.

A network function (NF) is a processing function in a network which has defined functional behaviors and interfaces. A NF can be implemented either as a network element on dedicated hardware, or as a software instance running on dedicated hardware, or as a virtualized function instantiated on an appropriate platform (e.g., a cloud infrastructure).

Network function virtualization (NFV) is a network architecture concept that uses virtualization to create network node functions as virtual building blocks connected to provide communication services. The aim is to transform the way that network operators architect networks by consolidating many network equipment types onto industry standard high volume servers, switches, and storage. NFs (e.g., session managements, Quality of Service (QoS)) are implemented in software that can run on standard server hardware. NFs may be instantiated at various locations such as data centers, radio access nodes, and on end user premises.

A network slice is a virtual partition of a radio access network, radio access node, and/or a core network. An end-to-end service orchestration engine "slices" virtual networks out of physical network resources. A network slice is composed of all the NFs and network services that are required to provide a device or component accessing a telecommunication system. Also, network slices can be configured to perform based on certain metrics such as capacity, latency, security, duration, reliability, coverage, and the like.

NFV bridges networking, orchestration, and application domains within a telecommunications system. NFV can also enable the cataloging, instantiation, and chaining of NFs with network-level services which creates a standardized mechanism for the telecommunications system, services, and application layers to exchange state, service level agreements, resources, as well as other types of information dynamically.

Embodiments of the present disclosure utilize NFV to implement NFs dynamically to a radio access node to improve load on the radio access node by cognitively analyzing information obtained from the radio access node. The cognitive analysis can provide insights (e.g., NFs) to improve performance across the radio access node. By evaluating the insights as well as other information (e.g., login patterns, transfer statistics, and workloads of user equipment connected to the radio access nodes), embodiments can provide the radio access node with an updated bearer mapping to improve performance.

Embodiments of the present disclosure utilize NFV to implement a system and a method for managing bearer channels within a radio access node. The method includes collecting node information from a radio access node, the node information includes resource sets operating within the radio access node. The method further includes receiving a bearer channel of a user equipment from the radio access node. The bearer channel includes a quality of service class identifier level. The method also includes connecting to the bearer channel that is transmitting data for the user equipment and generating an insight that is based on the data and the QCI level of the user equipment. The method further includes determining a bearer mapping for the radio access nodes by analyzing node information as well as the insight. The bearer mapping is then transmitted to the radio access node for implementation.

Figure 1:
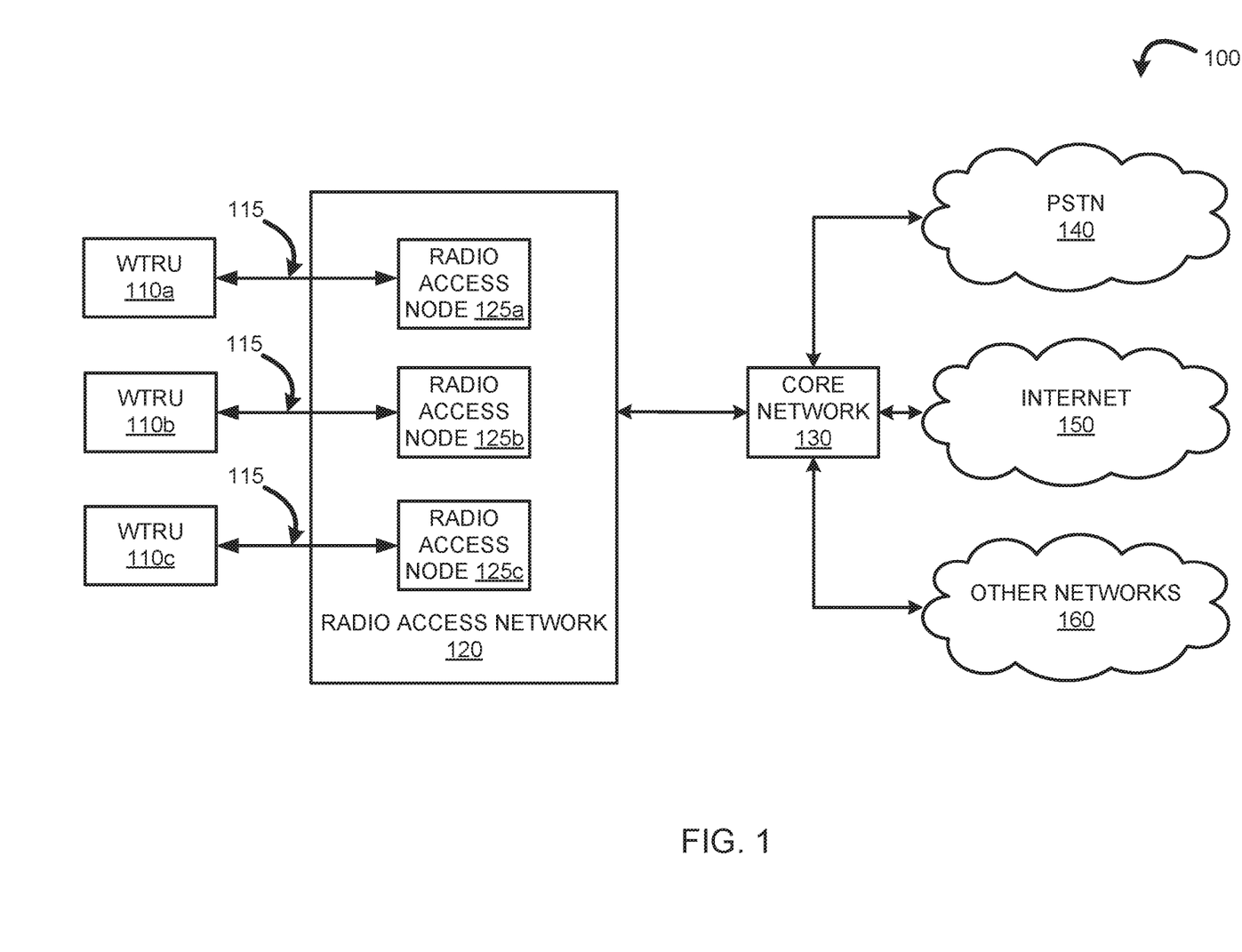
FIG. 1 is a block diagram illustrating a telecommunications system, according to embodiments of the present disclosure.

FIG. 1 illustrates a block diagram of a telecommunications system 100, according to embodiments of the disclosure. The telecommunications system 100 includes wireless transmit/receive unit (WTRU) 110*a*, 110*b*, and 110*c* (which generally or collectively may be referred to as WTRU 110), a radio access network (RAN) 120, a core network 130, a public switch telephone network (PSTN) 140, the Internet 150, and other networks 160. The RAN 120 includes a radio access nodes 125*a*, 125*b*, and 125*c* (which generally, or collectively, may be referred to as radio access node 125). The telecommunications system 100 may be a multiple-access system and employ one or more channel access schemes, such as code division multiple access (CDMA), time-division multiple access (TDMA), frequency division multiple access (FDMA), orthogonal frequency-division multiple access (OFDMA), single carrier FDMA (SC-FDMA), and the like.

The WTRU 110 is a device configured to operate and/or communicate within the telecommunications system 100. The WTRU 110 can include or be embodied in any type of apparatus or device configured to transmit and/or receive wireless signals. For example, the WTRU 110 can be user equipment (UE), a mobile station, a fixed or mobile subscriber unit, a pager, a cellular telephone, a personal digital assistant (PDA), a smartphone, a laptop, a tablet, a notebook computer, a personal computer, a wireless sensor, a wearable device such as a smart watch, a medical device, industrial equipment, a drone, a vehicle, truck, train, airplane, and the like.

The radio access network 120 is a component of the telecommunications system 100 configured to implement radio access technology. For example, the RAN 120 can be a GSM radio access network (GRAN), a GSM EDGE radio access network (GERAN), a UMTS radio access network (UTRAN), a long term evolution (LTE) high speed and low latency radio access network (E-UTRAN), and the like. The radio access network 120 provides the infrastructure to allow the WTRU 110 to connect to the core network 130. The RAN 120 can also include multiple radio access nodes and/or network elements (not shown), such as a base station control (BSC), a radio network controller (RNC), relay nodes, etc.

The radio access node 125 is a component of the telecommunications system 100 residing within the RAN 120 and configured to wirelessly interface with at least one WTRU 110 to facilitate access to one or more networks. For example, the radio access node 125 can facilitate access to the core network 130, the PSTN 140, the Internet 150, and/or other networks 160. By way of example, the radio access node 125 can be a base transceiver station (BTS), a Node-B, an eNode-B, an en-gNode-B, a ng-eNode-B, a gNode-B, and the like. While the radio access node 125 is depicted as a single element, it will be appreciated that the radio access node 125 may include any number of interconnected nodes and/or network elements. The radio access node 125 can be configured to transmit and/or receive wireless signals within a particular geographic region, which may be referred to as a cell (not shown). The cell may further be divided into cell sectors. For example, a cell associated a the radio access node 125 may be divided into three sectors with each sector having a transceiver. In some embodiments, the radio access node 125 employs multiple-input multiple-output (MIMO) technology, and therefore, utilizes multiple transceivers for each sector of the cell.

The radio access node 125 communicate with the WTRU 110 over an air interface 115. The air interface 115 can be any suitable wireless communications link (e.g., radio frequency (RF), microwave, infrared (IR), ultraviolet (UV), visible light, cmWave, mmWave, etc.). The air interface 115 can be established using any suitable radio access technology (RAT).

In some embodiments, the radio access node 125 and the WTRU 110 implement a radio technology such as Universal Mobile Telecommunications System (UMTS) Terrestrial Radio Access (UTRA), which may establish the air interface 115 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In some embodiments, the radio access node 125 and the WTRU 110 implement a radio technology such as Evolved UMTS Terrestrial Radio Access (E-UTRA), which may establish the air interface 115 using Long Term Evolution (LTE) and/or LTE-Advanced (LTE-A). In some embodiments, the air interface 115 implements New Radio (NR) technology.

In some embodiments, the radio access node 125 and the WTRU 110 implement radio technologies such as IEEE 802.16 (e.g., Worldwide Interoperability for Microwave Access (WiMAX)), CDMA2000, CMDA2000 IX, CDMA2000 EV-DO, Interim Standard 2000 (IS-200), Interim Standard 95 (IS-95), Interim Standard 856 (IS-856), Global System for Mobile Communications (GSM), Enhanced Data rates for GSM Evolution (EDGE), GSM EDGE (GERAN), and the like.

The core network 130 is a component of the telecommunications system 100 configured to provide voice, data, applications, and/or voice over internet protocol (VoIP) service to one or more WTRUs 110a, 110b, and 110c. For example, the core network 130 can provide call control, billing services, pre-paid calling, Internet connectivity, video distribution, etc. and perform high-level security function, such as user authentication. While not shown, it will be appreciated that the core network 130 can be in direct or indirect communication with other RANs that employ similar radio access nodes as the RAN 120. For example, in addition to being connected to RAN 120 which may be utilizing an E-UTRA radio technology, the core network 130 may also be in communication with another RAN employing a GSM radio technology.

In some embodiments, the core network 130 serves as a gateway for the WTRU 110 to access the PSTN 140, the Internet 150, and the other networks 160. The PSTN can include circuit-switched telephone networks that provide plain old telephone services (POTS). The Internet 150 includes a global system of interconnected computer networks and devices that use common communication protocols, such as the transmission control protocol (TCP), user datagram protocol (UDP), and the internet protocol (IP) in the TCP/IP internet protocol suite. The other networks 160 includes wired or wireless communication networks owned and/or operated by other service providers. For example, the other networks 160 can include another core network connected to multiple RANs.

Figure 2:
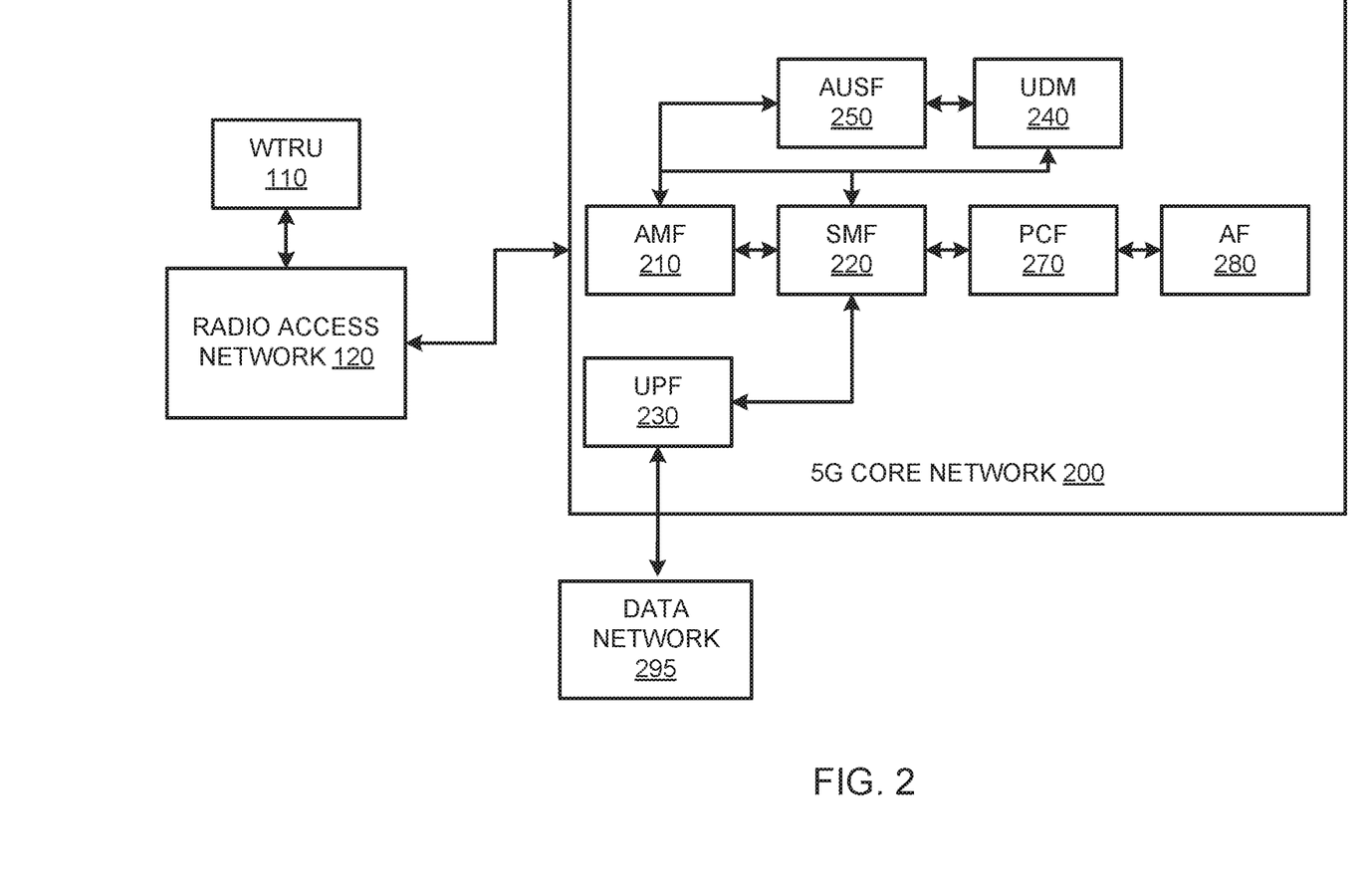
FIG. 2 is a block diagram illustrating a 5G core network, according to embodiments of the present disclosure.

FIG. 2 illustrates a 5G core network 200, according to embodiments of the present disclosure. The 5G core network 200 (e.g., which may be the same as, or substantially similar to, core network 130 of FIG. 1) includes an access and mobility management function (AMF) 210, a session management function (SMF) 220, a user plane function (UPF) 230, a user data management function (UDM) 240, a network exposure function (NEF) 245, an authentication server function (AUSF) 250, a network exposure function (NEF) 260, a policy control function (PCF) 270, and an application function (AF) 280. It should be understood that while each of the foregoing elements are depicted as part of the 5G core network 200, it will be appreciated that any one of these elements may be owned and/or operated by an entity other than the core network operator. It should also be understood that a 5G core network may not consist of all of these components, may consist of additional components, and may consist of multiple instances of each of these components.

The AMF 210 is a component of the 5G core network 200 configured to serve as a control node and is connected to the RAN 120. In some embodiments, the AMF 210 is responsible for registration management, connection management, reachability management, access authentication, and access authorization. Typically, the AMF 210 routes and forwards NAS packets to and from the WTRUs 110a, 110b, 110c.

The SMF 220 is a component of the 5G core network 200 configured to provide the WTRUs 110a, 110b, and 110c with access to a data network 295 (e.g., which may be the same as, or substantially similar to, the Internet 150 of FIG. 1) to facilitate communications between the WTRUs 110a, 110b, and 110c and IP-enabled devices. The SMF 220 is further configured to manage and configure traffic steering rules in the UPF 230 via an N4 interface.

The UPF 230 is a component of the 5G core network 200 configured for interconnecting a packet data unit (PDU) session with the data network 295. The UPF 230 is further configured for packet routing and forwarding, poly rule enforcement, quality of service (QoS) handling for user plane traffic, and downlink packet buffering.

The UDM 240 is a component of the 5G core network 200 configured to act as a repository for authentication credentials and subscription information. The UDM 240 can be connected the other functions within the 5G core network 200 such as the SMF 220 and the AUSF 250.

The NEF 245 is a component of the 5G core network 200 configured to expose the capabilities and service in the 5G core network 200. The NEF 245 provides for a secure exposure of network services (e.g., voice, data connectivity, charging, subscriber data, etc.) toward $3^{rd}$ party applications over APIs. The NEF 245 can also include an integration layer that can connect $3^{rd}$ party applications (e.g., AIBCAM) to the 5G core network 200.

The AUSF 250 is a component of the 5G core network 200 configured to perform authentication related operations and connects to the UDM 240 over an N13 interface and the AMF 210 over an N12 interface.

The PCF 270 is a component of the 5G core network 200 configured to provide policy rules to control plane nodes, such as the AMF 210 and the SMF 220, which allows the control plane nodes to enforce the provided policy rules. The PCF 270 can be connected to the SMF 220 over an N7 interface, to the AMF 210 over an N15 interface, and to the AF 290 over an N5 interface.

The AF 280 is a component of the 5G core network 200 configured to provide application influence on traffic routing, accessing the NEF 245 and interaction with the PCF 270. The AF 280 can also provide quality control for specific application with reside on the network.

Operator-defined, enterprise, and third party services may be deployed as network functions in a tenant domain or as an over the top (OTT) manner. When deployed within a core network, they can be connected via an interconnection routing function and then integrated into a core network operator's NFV framework. The services can then be allowed to control and interact with the network, or network slice, via a Service Capability Exposure Function (SCEF). Other techniques for implementing services over a 5G core network can also be implemented. For example, a service can be deployed in an OTT manner via an egress node.

Figure 3:
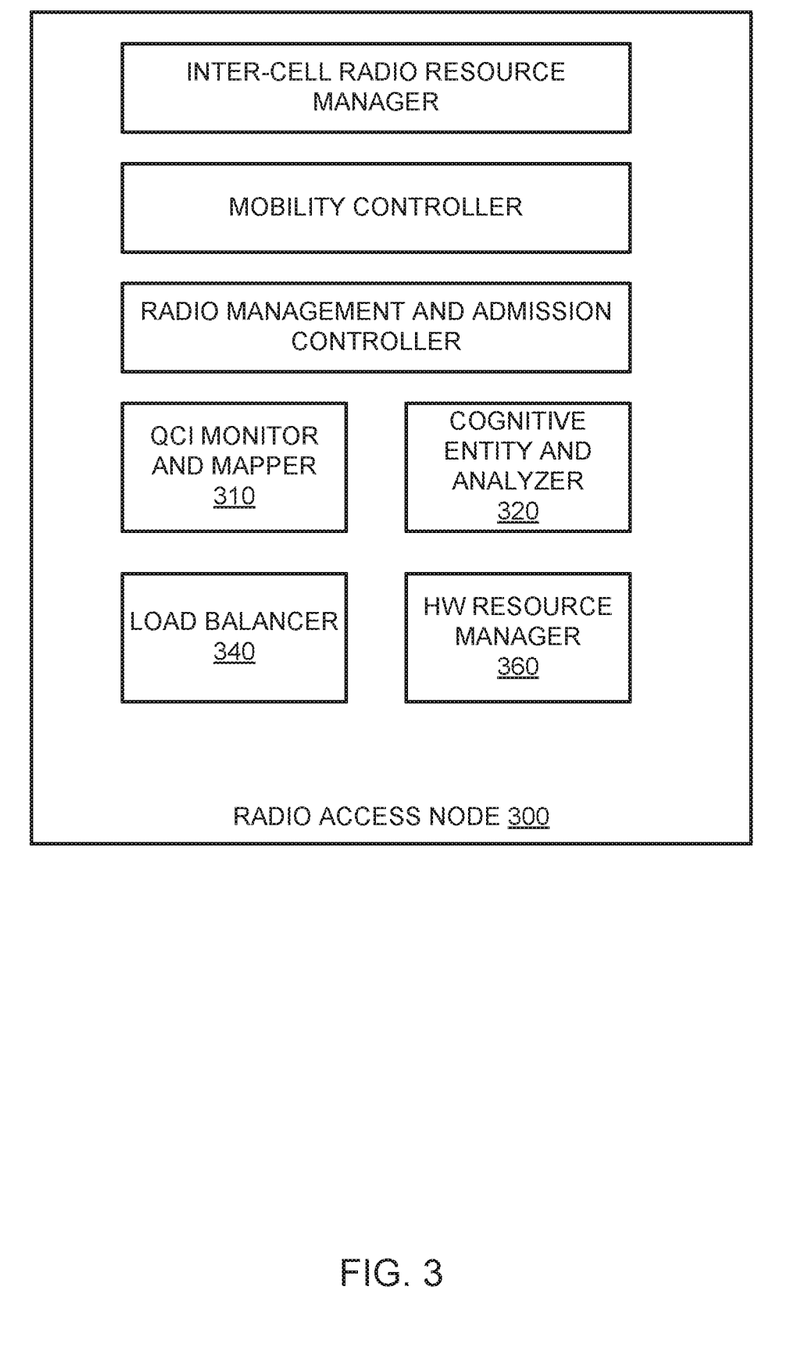
FIG. 3 is a block diagram illustrating a radio access node, according to embodiments of the present disclosure.

FIG. 3 illustrates a block diagram of a radio access node 300 (e.g., which may be the same as, or substantially similar to, the radio access node 125 of FIG. 1), according to embodiments of the present disclosure. The radio access node 300 includes an inter-cell radio resource manager, a mobility controller, a QCI monitor 310, a cognitive entity and analyzer 320, a load balancer 340, and a hardware resource manager 360. The radio access node 300 can maintain a physical resource pool of processing resources, storage resources, and networking resources. From that resource pool, resource sets can be generated to handle the load across the radio access node. Each resource set can maintain its own processing, storage, and networking resources to handle the workload assigned to it.

The QCI monitor 310 is a component of the radio access node 300 configured to monitor the QoS of WTRUs (such as WTRU 110) connected to the radio access node 300. To ensure that bearer traffic through a telecommunications system is handled appropriately, each bearer is assigned a level of QoS. The QCI monitor 310 works to ensure that the level of QoS assigned to each bearer and to assign different types of bearers to different classes, with each class having appropriate QoS parameters for the traffic type. The QCI monitor 310 monitors the QCI designations for each of the bearers working within the radio access node 300 to make sure that the QoS is being met. In some embodiments, the QCI monitor 310 is also configured to map the bearers with the appropriate QCI level.

The cognitive analyzer 320 is a component of the radio access node 300 configured to analyze the information provided to the radio access node 300. The cognitive analyzer 320 can provide insights for the radio access node 300 by inputting designated datasets of the information provided into appropriate machine learning algorithms.

The load balancer 340 is a component of the radio access node 300 configured to balance the traffic load received by the radio access node 300, according to embodiments of the present disclosure. The load balancer 340 handles traffic load by distributing computational work (e.g., bearer traffic) between the resource sets within the radio access node 300. In some embodiments, the load balancer 340 distributes to the resource sets based on the QCI level of the traffic. For example, if a bearer contains traffic consisting of video playback requiring a high QoS expectation, the load balancer 340 can distribute the traffic to a resource set handling less traffic.

The hardware resource manager 360 is a component of the radio access node 300 configured to manage and allocate resources within the radio access node 300, according to embodiments of the present disclosure. Within the radio access node 300, resource sharing architecture is implemented. Within the resource sharing architecture, a common pool of networking, storage, computing resources are available. Through the computing resources, radio evolved packet data streams (EPS) can be translated into a fixed access network stream which can be sent to a core network. Through software abstraction, the hardware resource manager 360 can divide the physical hardware resource pool into individualized resource-sets, or network slices. Each resource set can typically contain the processing resources, networking resources, and storage resources necessary for the computation and management of bearer traffic across the radio access node 300.

Figure 4:
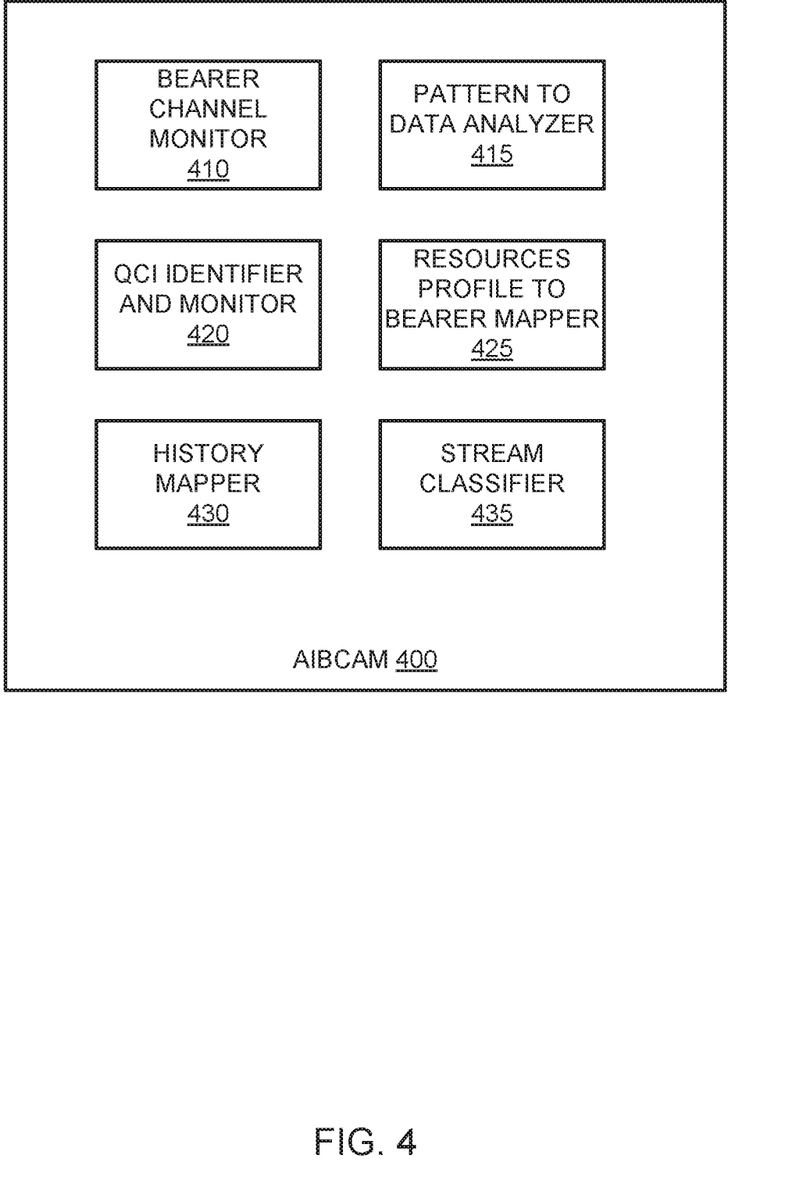
FIG. 4 is a block diagram illustrating an artificial intelligence based bearer channel allocator and manager, according to embodiments of the present disclosure.

FIG. 4 illustrates an artificial intelligence based bearer channel allocator and manager (AIBCAM) 400, according to embodiments of the present disclosure. The AIBCAM includes a bearer channel monitor 410, a pattern to data analyzer 415, a QCI identifier and monitor 420, a resource profile to bearer mapper 425, a history mapper 430, and a stream based classifier 435. In some embodiments, the AIBCAM 400 is implemented within the NFV layer of a core network. In some embodiments, the AIBCAM 400 is implemented within a radio access node (such as radio access node 125 of FIG. 1). In some embodiments, the AIBCAM 400 operates as two instances, with the first instance running from within a radio access node, and the second instance running from within the core network (such as core network 200 of FIG. 2). Each instance can communicate with other instances to provide and receive information.

The AIBCAM 400 can utilize NFV framework to access and utilize NFs available to the 5G core network 200. For example, the AIBCAM 400 can access the AMF 210, SMF 220, the UPF 230, the UDM 240, the AUSF 250, and the like (shown in FIG. 2). By accessing these functions, the AIBCAM 400 can gather information regarding the core network 200 as well as from radio access nodes transmitting data to the core network 200.

The bearer channel monitor 410 is a component of the AIBCAM 400 configured to monitor the bearer channels of WTRUs, or UEs, for changes in the control plane and data plane of the bearer channels. For example, the bearer channel monitor 410 can monitor I/O traffic across a bearer channel for its entire lifespan to detect for any changes in the QCI for that particular bearer channel. The bearer channel monitor 410 can collect pertinent information regarding the bearer channels for a particular radio access node in order for that data to be analyzed and classified. In some embodiments, the collection of bearer channel information is performed as a streaming operation from a radio access node to a core network.

The pattern to data analyzer 415 is a component of the AIBCAM 400 configured to analyze data to detect patterns within the data, according to embodiments of the present disclosure. The data received from a radio access node can be analyzed to determine if any patterns within the data can be determined. For example, the data may indicate times of the day when there is an uptick in video streaming or when the Internet is accessed for web browsing. Patterns can also be detected that indicate a trend where users tend to use different services at different times. For example, a pattern may be detected that users typically do not use call services during certain times of the day or when Internet access is lessened.

The QCI identifier and monitor 420 is a component of the AIBCAM 400 configured to identify QCI levels of bearer channels, according to embodiments of the present disclosure. The QCI identifier and monitor 420 is further configured to monitor for any changes in the QCI levels that may require a radio access node to be rebalanced. For example, if a radio access node is transmitting data bearers having an influx of high priority QCI levels, the QCI identifier and monitor 420 can detect and monitor for that type of influx to notify the AIBCAM 400 of that change.

The resources profile to bearer mapper 425 is a component of the AIBCAM 400 configured to store a resource-set profile for a radio access node with corresponding bearers mapped to each resource-set. The information maintained by the resources profile to bearer mapper 425 can be used when determining a new bearer mapping configuration for a radio access node. Once a radio access node is configured with a bearer mapping, the resources profile to bearer mapper 425 can obtain information regarding the resource-set as well as the bearer mapping to those resources. In the event that a radio access changes either a resource configuration or bearer mapping, the resources profile to bearer mapper 425 can be updated to reflect those changes.

The history mapper 430 is a component of the AIBCAM 400 configured to store historical bearer mappings of radio access nodes, according to embodiments of the present disclosure. The history mapper 430 can maintain useful bearer mappings in order for the AIBCAM 400 to gain insights from those mappings. For example, bearer mappings can be used to determine whether certain QCI level allocations for a resource-set sufficiently reduced congestion within that radio access node.

The stream classifier 435 is a component of the AIBCAM 400 configured to perform analytic operations on the data streamed by a radio access node as well as the collected data to generate insights on bear channel usage, according to embodiments of the present disclosure. The stream classifier 435 can use known data classification techniques on the data received to determine an estimation of workload characteristics for a radio access node. A type of QCI class can be identified based on traffic generated by a WTRUs accessing the radio access node. This can be based on time, situations, and nature of traffic generated. The stream classifier 435 can perform predictive analysis, spam detection, pattern detection, image classification, as well other types of categorical classifications. The stream classifier 435 can also employ different algorithmic methods to generate insights from the data stream. For example, the stream classifier 435 may be a perceptron, a Naïve Bayes, a decision tree, a logistic regression, a k-nearest neighbor, a neural network, a support vector machine, or any other type of algorithm capable of classification. The stream classifier 435 is further configured to provide a prediction probability for each insight predicted. For example, if the stream classifier 435 predicts a data stream insight predicting an uptick in video streaming usage, that prediction is accompanied with a prediction probability, or confidence level, the stream classifier 435 has in providing that prediction. The prediction probability can be a percentage range from 0% to 100% depending on the confidence of the classifier. It should be noted that other forms of prediction probability can also show the confidence level of a predicted label by a given classifier. As the stream classifier 435 is trained, the prediction probabilities can also increase with each training iteration.

Figure 5:
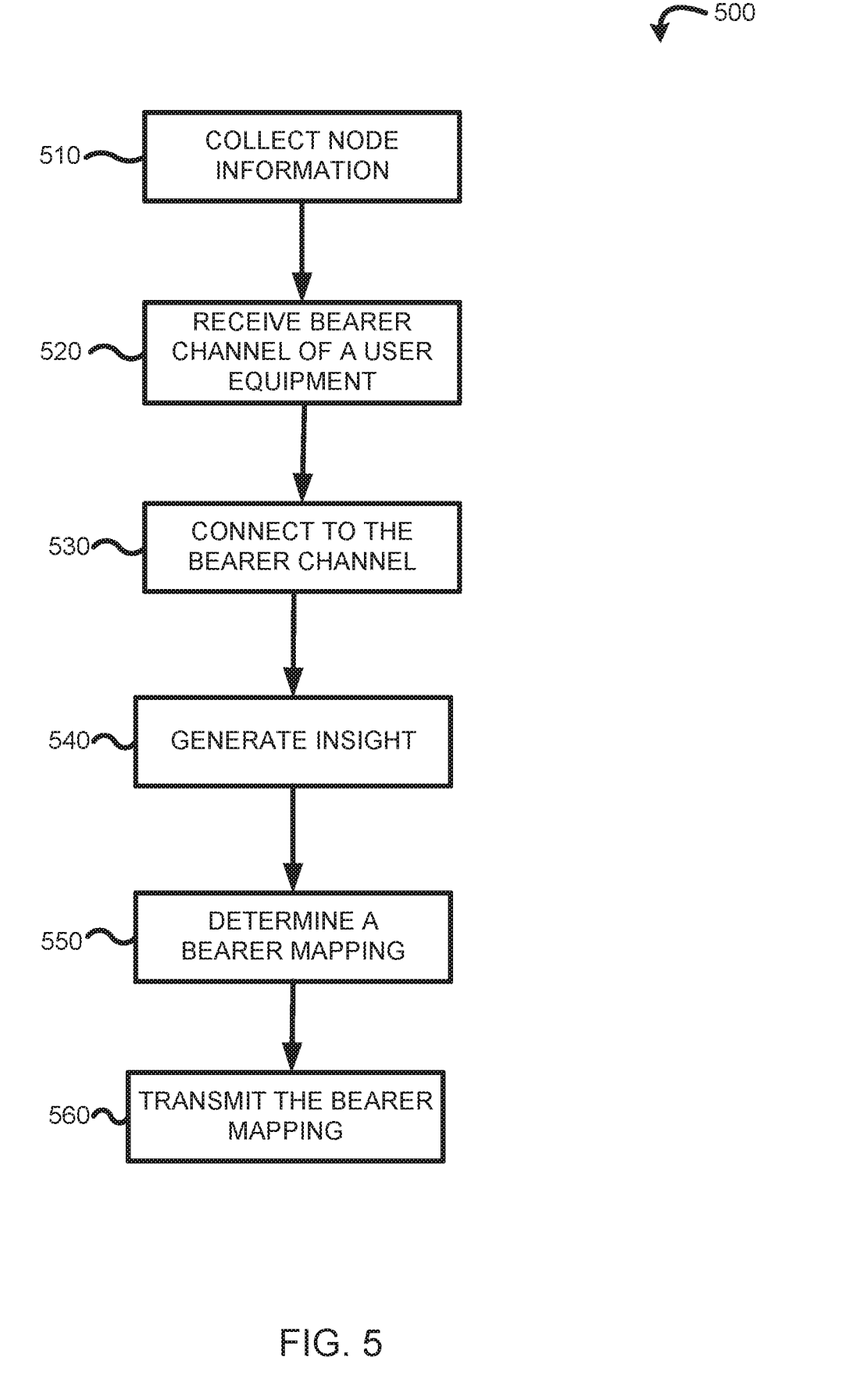
FIG. 5 is a flow diagram illustrating a process of generating a bearer mapping for a radio access node, according to embodiments of the present disclosure.

FIG. 5 is a flow diagram illustrating a process 500 of determining a bearer mapping for a radio access node, according to embodiments of the present disclosure. Node information for a radio access node 300 is collected by the AIBCAM 400 implemented on a core network 200. This is illustrated at step 510. The node information can include information regarding the resource sets used by the radio access node 300. For example, the node information can indicate the amount of resource sets used by the radio access node, the resource set specifications (e.g., computing power, storage allocated, memory amount), and the QCI levels for bearers being translated across each resource set. The AIBCAM 400 can collect node information from the radio access node 300 at an interval to allow for changes to be detected. It should be noted that multiple radio access nodes can transmit node information for the AIBCAM 400 to collect. The node information collected can be analyzed separately and collectively as the AIBCAM 400 in accordance with embodiments. Additional node information can include the amount of WTRUs 110 currently connected to, and operating on, the radio access node 300, the geographic region of the radio access node 300 is configured to transmit and/or receive wireless signals, the type of radio interface and technology the WTRUs 110 are communicating with (e.g., UMTS, UTRA, CMDA, WCDMA, LTE, NR), which communication protocols are being implemented (e.g., HSPA, HSPA+, HSUPA), and the like.

The AIBCAM 400 receives bearer channel information for a WTRU 110 connected to the radio access node 300. This is illustrated at step 520. The bearer channel information can include information regarding the data bearer used to transmit data from a WTRU 110 to the radio access node 300. For example, the bearer channel information can include the type of bearer used, the QoS expectation, the QCI level, and the like.

Once the bearer channel information is received, the bearer channel monitor 410 can connect to the bearer channel to monitor data transmission across the bearer. This is illustrated at step 530. In some embodiments, the AIBCAM 400 implements the AMF 210 of the 5G core network 200 to connect to the bearer channel. This allows for connection management, access authentication, and access authorization to be performed when accessing the bearer channel. As data transmissions are monitored by the bearer channel monitor 410, information can be collected and used to generate insights on that data.

The node information and data from the bearer channel are processed by the stream classifier 435 to generate insights. This is illustrated at step 540. The node information and data collected can be pre-processed and organized into a dataset (e.g., labeled dataset, unlabeled dataset) and processed by the stream classifier 435 to output an insight. For example, the insight produced can be a QoS expectation for a particular WTRU, anticipated QCI levels for a radio access node, an anticipated demand on a radio access node, anticipated QCI level workload, a NF, and the like. The insights produced can be predetermined to best suit the AIBCAM 400 in determining an optimized bearer mapping for the radio access node 300. Based on the insight produced, the stream classifier 435 can utilize a variety of models (e.g., neural network, deep learning, decision tree, perceptron) to analyze the dataset and output an insight of high probability.

The resources profile to bearer mapper 425 generates a bearer mapping for the radio access node. This is illustrated at step 550. The bearer mapping can be determined and generated based on, at least partially, on the insight, the QCI levels, the load across the radio access node 300, and the resource sets. The bearer mapping can align with the respective resource sets of the radio access node 300 and allocates the proper bearer channels to each resource set to ensure high performance during RAN congestion. The high performance can be based on the frequency in which the load is able to provide the QoS expectations for the WTRUs 110 connected to the radio access node 300. For example, a WTRU 110 can be connected to the radio access node 300 with a data bearer transmitting a video stream to the WTRU 110. If the radio access node 300 is capable of maintaining the QoS for the WTRU 110 during times of high congestion, then the bearer mapping can be considered as optimized.

In some embodiments, the bearer mapping also includes network slicing for the radio access node 300. For example, if the radio access node 300 was operating with two network slices, the bearer mapping can determine that additional, or fewer, network slices operated by the radio access node 300 can handle the workload across the radio access node 300 optimally.

Once the bearer mapping is generated, the AIBCAM can transmit it to the radio access node 300 for implementation. This is illustrated at step 560. The bearer mapping can be generated and transmitted to the radio access node 300 dynamically. For example, if the radio access node 300 fails to maintain QoS expectation for the WTRUs 110 connected to it, then an updated bearer mapping can be determined and transmitted. In some embodiments, the bearer mapping is generated and transmitted at an interval, where the radio access node 300 is continuously sent optimized bearer mappings for implementation.

Figure 6:
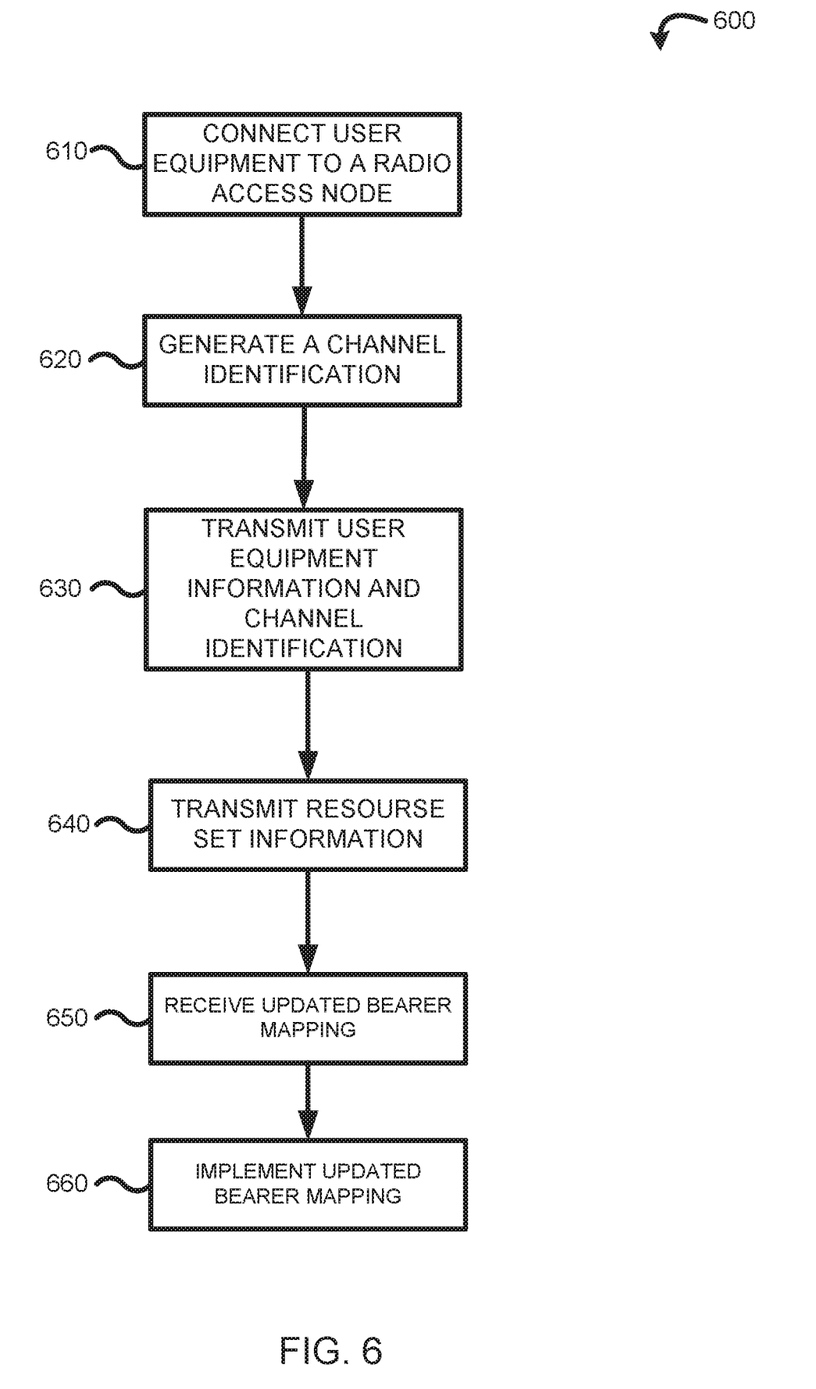
FIG. 6 is a flow diagram illustrating a process of providing information of a radio access node to a core network, according to embodiments of the present disclosure.

FIG. 6 is a flow diagram illustrating a process 600 of providing a core network with information from a radio access node, according to embodiments of the present disclosure. A radio access node 300 connects a WTRU 110 to a RAN 120. This is illustrated at step 610. Initially, the radio access node 300 receives a service request from a WTRU 110, wherein the service request includes a QoS requirement and a mobility characteristic. The service request can then be used to connect the WTRU 110 to a resource set, or network slice, being operated by the radio access node 300. The radio access node 300 may select a resource set to connect the WTRU 110 based on workload on the resource sets currently on each resource set. When the radio access node 300 determines which resource set is capable of performing the service request of the WTRU 110, a connection can be established.

Once connected to the radio access node 300, a bearer channel identification can be generated for the WTRU 110. This is illustrated at step 620. The bearer channel identification can be used to connect to and monitor data transmission across the WTRU 110 to the radio access node 300. The bearer channel identification can also be used in reassigning bearer traffic to different resource sets. For example, the bearer channel identification can be grouped by QoS requirements and reallocated to a resource set capable of providing the appropriate QoS or QCI level.

The WTRU 110 information and channel identification are transmitted to an AIBCAM 400. This is illustrated at step 630. The WTRU 110 information can include hardware specifications, service request information, which resource set the WTRU 110 is connected to, and the like. The channel identification provides a means for the AIBCAM 400 to connect to the bearer channel without disruption and to monitor for possible QoS changes.

The radio access node 300 transmits resource set information to the AIBCAM 400. This is illustrated at step 640. The radio access node 300 can operate from a pool of physical hardware resources such as computing, networking, and storage resources. By way of NFV, the resources can be divided into resource sets, or network slices. The amount of resource sets operating from the pool of physical hardware can be provided to the AIBCAM 400. Also, additional information regarding the resource sets can also be sent. For example, resource set configuration, capability, specification, workload, current load, QCI levels, and the like can all be sent to the AIBCAM 400 for analysis.

An updated bearer mapping for the radio access node 300 is received from the AIBCAM 400. This is illustrated at step 650. The bearer mapping can include workload distribution across current resource sets, additional or fewer resource sets, resource set resource pool allocation, QCI level distribution, WTRU 110 distribution, and the like. Once received, the radio access node 300 implements the bearer mapping. This is illustrated at step 660.

Figure 7:
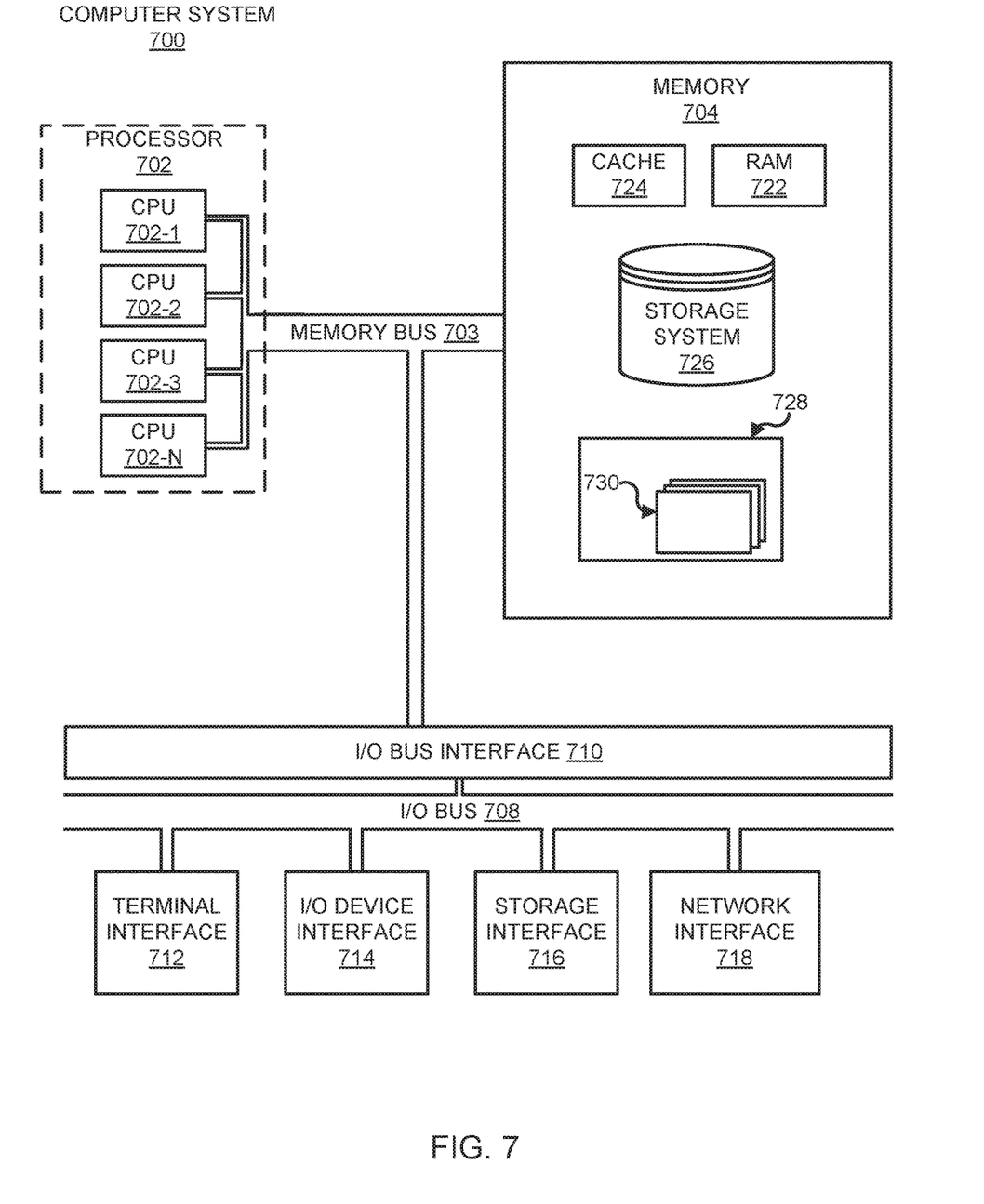
FIG. 7 is a high-level block diagram illustrating an example computer system that may be used in implementing one or more of the methods, tools, and modules, and any related functions, described herein, according to embodiments of the present disclosure.

Referring now to FIG. 7, shown is a high-level block diagram of an example computer system 700 (e.g., the AIBCAM 400 of FIG. 4) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 700 may comprise one or more processors 702, a memory 704, a terminal interface 712, a I/O (Input/Output) device interface 714, a storage interface 716, and a network interface 718, all of which may be communicatively coupled, directly or indirectly, for inter-component communication via a memory bus 703, a I/O bus 708, and an I/O bus interface 710.

The computer system 700 may contain one or more general-purpose programmable central processing units (CPUs) 702-1, 702-2, 702-3, and 702-N, herein generically referred to as the processor 702. In some embodiments, the computer system 700 may contain multiple processors typical of a relatively large system; however, in other embodiments the computer system 700 may alternatively be a single CPU system. Each processor 702 may execute instructions stored in the memory 704 and may include one or more levels of on-board cache.

The memory 704 may include computer system readable media in the form of volatile memory, such as random-access memory (RAM) 722 or cache memory 724. Computer system 700 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

Although the memory bus 703 is shown in FIG. 7 as a single bus structure providing a direct communication path among the processors 702, the memory 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 700 may, in some embodiments, contain multiple I/O bus interface units, multiple I/O buses, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 700 may be a multi-user mainframe computer system, a single-user system, or a server computer or similar device that has little or no direct user interface, but receives requests from other computer systems (clients). Further, in some embodiments, the computer system 700 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 700. In some embodiments, however, individual components may have greater or lesser complexity than as represented in FIG. 7, components other than or in addition to those shown in FIG. 7 may be present, and the number, type, and configuration of such components may vary.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 728 and/or program modules 730 generally perform the functions or methodologies of various embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a bearer channel monitor configured to connect to bearer channels connected to radio access nodes and to monitor data transmissions across the bearer channels, wherein the data transmission includes information indicating a change in quality of service of the bearer channel;
    a pattern to data analyzer configured to detect patterns within the data transmissions;
    a history mapper configured to store historical bearer mappings of the radio access nodes, wherein the historical bearer mappings include resource-set profiles for the radio access nodes with bearers mapped to resource sets;
    a quality of service monitor configured to identify quality of service class identifier (QCI) levels of the data transmissions and monitor for changes in the QCI levels;
    a stream classifier configured to generate insights and prediction probabilities associated with the insights by performing a cognitive analysis on the data transmission, the patterns, and the QCI levels, wherein the insights provide understandings on usage of the bearer channel and an estimation of workload characteristics; and
    a resource profile to bearer mapper configured to receive resource set information from the radio access nodes, the resource profile to bearer mapper further configured to generate updated bearer mappings for the radio access nodes based on the insights, the resource set information.

2. The system of claim 1, wherein the resource set information includes a number of resource sets being operated by the radio access node.

3. The system of claim 2, wherein each resource set of the resource sets is configured to translate radio signals received from a user equipment to data signals for transmission to a core network.

4. The system of claim 1, wherein the resource profile to bearer mapper is further configured to transmit the updated bearer mappings to the radio access nodes upon generating the updated bearer mappings.

5. The system of claim 1, wherein the data transmissions include login patterns, transfer statistics, and workloads of user equipment connected to the radio access nodes.

6. The system of claim 1, wherein the stream classifier includes history of user equipment and QCI level priorities in generating the insights.

7. The system of claim 1, wherein the updated bearer mappings distribute workloads for the radio access nodes across the resource sets.

8. A computer implemented method, comprising:
    collecting node information from a radio access node, the node information including resource sets operating within the radio access node;
    receiving, from the radio access node, a bearer channel of a user equipment connected to the radio access node, the bearer channel including a quality of service class identifier (QCI) level;
    connecting to the bearer channel, wherein bearer channel transmits data related to the user equipment and indicating a change in quality of service of the radio access node;
    generating an insight and a prediction probability associated with the insight, using data and the QCI level of the user equipment, wherein the insight provides an understanding on usage of the bearer channel and an estimation of workload characteristics;
    determining a bearer mapping for the radio access node by analyzing the node information and the insight, wherein the bearer mapping includes a resource-set profile for the radio access node with bearers mapped to resource sets; and
    transmitting the bearer mapping to the radio access node.

9. The method of claim 8, wherein the resource sets are a set of network slices operated by the radio access node using network function virtualization.

10. The method of claim 8, wherein the data related to the user equipment includes login patterns, transfer statistics, and workload of the user equipment.

11. The method of claim 8, wherein the bearer mapping distributes a workload for the radio access node across the resource sets.

12. The method of claim 8, wherein connecting to the bearer channel comprises:
    establishing a connection to the bearer channel to monitor the data being transmitted;
    monitoring the bearer channel for a change in the QCI level; and
    reporting the change in the QCI level, upon detecting the change in the QCI level.

13. The method of claim 8, wherein generating the insight comprises:
performing a cognitive analysis on the data and the QCI level by implementing machine learning techniques;
outputting the insight from the cognitive analysis, wherein the insight is a quality of service anticipation for the radio access node.

14. The method of claim 13, wherein the cognitive analysis includes a history of the user equipment and a priority of the QCI level when determining the insight.

15. A computer implemented method, comprising:
connecting a user equipment to a radio access node over a radio bearer;
generating a channel identification related to the user equipment;
transmitting, over a network bearer, to a core network, user equipment information of the user equipment and the channel identification, the user equipment information including a quality of service class identifier (QCI) level and additional information indicating changes in quality of service of the radio access node;
transmitting resource set information to the core network, wherein the resource set information includes a number of resource sets operating on the radio access node, where each resource set of the resource sets is configured to translate radio signals received from the user equipment to data signals for transmission to the core network;
receiving an updated bearer mapping to be implemented across the resource sets, wherein the updated bearer mapping includes a resource-set profile for the radio access node with bearers mapped to the resource sets, and wherein the updated bearer mapping is a result of insights, and prediction probabilities associated with the insights, providing an estimation of workload characteristics; and
implementing the updated bearer mapping on the radio access node.

16. The method of claim 15, wherein the resource sets are network slices operated by the radio access node using network function virtualization.

17. The method of claim 15, further comprising:
transmitting physical hardware details of the radio access node and resource profiles to the core network for evaluation.

\* \* \* \* \*